(12) United States Patent
Raghunath

(10) Patent No.: US 7,525,568 B2
(45) Date of Patent: Apr. 28, 2009

(54) PERSONAL MULTI-INFORMATION RECORDER

(75) Inventor: Mandayam Thondanur Raghunath, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/984,380

(22) Filed: Nov. 9, 2004

(65) Prior Publication Data

US 2006/0098088 A1 May 11, 2006

(51) Int. Cl.
*H04N 7/18* (2006.01)

(52) U.S. Cl. .................... 348/61; 348/158; 340/539.21; 340/539.23

(58) Field of Classification Search .................. 348/61, 348/157–158, 14.1–14.6, 231.3; 600/301; 382/26, 91–92, 122, 356; 340/539.21, 539.23
See application file for complete search history.

(56) References Cited

U.S. PATENT DOCUMENTS

| | | | | |
|---|---|---|---|---|
| 4,948,371 | A * | 8/1990 | Hall | 434/21 |
| 5,012,335 | A * | 4/1991 | Cohodar | 348/158 |
| 5,594,498 | A * | 1/1997 | Fraley | 348/158 |
| 5,598,151 | A * | 1/1997 | Torii, Jr. | 340/5.33 |
| 6,166,639 | A * | 12/2000 | Pierce et al. | 340/573.1 |
| 6,363,223 | B1 * | 3/2002 | Gordon | 396/263 |
| 6,563,532 | B1 | 5/2003 | Strub et al. | 348/158 |
| 6,735,897 | B1 * | 5/2004 | Schmitter et al. | 42/70.01 |
| 6,847,295 | B1 * | 1/2005 | Taliaferro et al. | 340/539.13 |
| 7,072,671 | B2 * | 7/2006 | Leitch | 455/456.1 |
| 2003/0105583 | A1 * | 6/2003 | Aloi et al. | 701/207 |
| 2003/0112133 | A1 * | 6/2003 | Webb et al. | 340/436 |
| 2003/0215010 | A1 * | 11/2003 | Kashiwa | 375/240.02 |
| 2004/0066271 | A1 * | 4/2004 | Leck | 340/3.1 |
| 2004/0246127 | A1 * | 12/2004 | Junqua | 340/539.13 |

OTHER PUBLICATIONS

Larry Husten, "I am a Camera," NetGuide, Jun. 1995.
Steve Mann, "'Reflectionism' and 'Diffusionism': New Tactics for Deconstructing the Video Surveillance," University of Toronto.
Steve Mann, "Wearable Computing: A First Step Toward Personal Imaging," Cybersquare, Computer, vol. 30, No. 2, Feb. 1997.
Dr. Doug Gage, "LifeLong" Technical Program.
"DARPA Wants your Life Indexable and Searchable," defensetech.
Noah Shachtman, "Pentagon Kills LifeLog Project," Wired News, Feb. 4, 2004.

* cited by examiner

*Primary Examiner*—Mehrdad Dastouri
*Assistant Examiner*—Jeremaiah C Huber
(74) *Attorney, Agent, or Firm*—Michael J. Buchenhomer; Vazken Alexanian

(57) ABSTRACT

A method for recording information on a device worn on a person includes capturing video information, capturing audio information and receiving a signal from a remote unit. The method further includes determining from the signal that the remote unit is a minimum distance from the device and in response commencing recording of the video information and the audio information in storage. In one alternative, the video information is captured via a video camera and audio information is captured via a microphone. In another alternative, the remote unit is installed in the person's vehicle.

1 Claim, 5 Drawing Sheets

US 7,525,568 B2

PERSONAL MULTI-INFORMATION RECORDER

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of cognitive computing and more particularly relates to the field of personal data collection, processing and dissemination.

BACKGROUND OF THE INVENTION

Law enforcement can be a complex and dangerous business. Police officers and security personnel must take into account various, and sometimes conflicting, considerations of personal safety, observing proper police procedures, and treating perpetrators or suspects fairly. In an effort to aid the tasks of the law enforcement professional and to lower police misconduct, the installation of video cameras in law enforcement vehicles entered into the fray. Video cameras are used to capture live encounters with perpetrators or suspects as well as to capture a police officer's actions during his employment. Because these video cameras catch live video of incidents, there is little one can do to dispute their veracity. As a result, the use of these cameras has reduced the number of claims against police officers, reduced the number of suspects that fight charges in court, increased the conviction rate on charges and lowers the number of incidents of police misconduct. In-vehicle video cameras, however, do not come without their drawbacks.

First, in-vehicle video cameras typically mounted on the front dashboard of a car and face forward. This works for capturing video of a vehicle chase or any incidents that occur in front of the camera, i.e., in front of the vehicle. However, this placement does not allow for the capturing of incidents that happen behind the vehicle or on the side of the vehicle. Furthermore, if a foot chase ensues beyond the area of the vehicle or the police officer enters a building or other structure, the in-vehicle video camera cannot capture any relevant video of an incident that occurs between the police officer and the suspect.

Second, the activation (and deactivation) of the recording of video by in-vehicle video cameras can be problematic. Police officers often forget to command the video system to start recording, thereby negating any benefit of the video system itself. Additionally, recording trigger mechanisms (as well as mechanisms for stopping the recording function) can be cumbersome and difficult to use, thereby enabling police officers to forgo using the trigger mechanism when engaged in a task requiring intense concentration.

Currently, the trend is to make electronic devices smaller and smaller. This enables ease of use and lessens the load and annoyance on consumers. For law enforcement, smaller devices are especially desirable, as officers must maintain a high level of agility and dexterity when performing their jobs. But smaller devices give rise to a new set of problems. For example, automatic activation and deactivation of recording functions are desirable because audio/video storage space on a small mechanism must be conserved. Also, the battery life of the power source used to power the recording function must be preserved in order to allow for prolonged use without a battery change or a battery charge. Furthermore, automatic activation and deactivation of recording functions reduces the total amount of audio/video that is recorded, which in turn reduces the amount of audio/video that must be reviewed when a pertinent incident must be investigated.

Third, in-vehicle video systems typically capture video and audio information, but fail to capture other types of crucial information such as the location of the vehicle or police officer, personal information of the police officer, such as heart rate or other vital statistics, and situational information, such as still image data, speed data and acceleration data. This additional information can aid in determining when to start recording audio and/or video information and can aid in analyzing an incident captured on video.

Therefore, there is a need to overcome problems with the prior art as discussed above, and more particularly a need to make the process of automatically recording multiple types of information.

SUMMARY OF THE INVENTION

Briefly, according to an embodiment of the invention, a method for recording information on a device worn on a person includes capturing video information, capturing audio information and receiving a signal from a remote unit. The method further includes determining from the signal that the remote unit is a minimum distance from the device and in response commencing recording of the video information and the audio information in storage. In one alternative, the video information is captured via a video camera and audio information is captured via a microphone. In another alternative, the remote unit installed in the person's vehicle.

In another embodiment of the present invention, an information processing system for wearing on a person is disclosed. The information processing system includes an apparatus for securing the information processing system to a person, a video camera for capturing video information and a microphone for capturing audio information. The information processing system further includes storage for storing video information and audio information and a receiver for receiving a signal from a remote unit. The information processing system further includes a processor configured for determining from the signal that the remote unit is a minimum distance from the device and in response commencing recording of the video information and the audio information in storage.

In yet another embodiment of the invention, a method for recording information on a device worn on a person includes capturing video information, capturing audio information and receiving a signal from another device worn on the person, wherein the signal indicates a hostile situation. The method further includes commencing recording of the video information and the audio information in storage in response to receiving the signal. In one alternative, the other device is a gun or a gun holster.

In yet another embodiment of the present invention, an information processing system for wearing on a person is disclosed. The information processing system includes an apparatus for securing the information processing system to a person, a video camera for capturing video information and a microphone for capturing audio information. The information processing system further includes storage for storing video information and audio information and a receiver for receiving a signal from another device worn on the person, wherein the signal indicates a hostile situation. The information processing system further includes a processor configured for commencing recording of the video information and the audio information in storage in response to receiving the signal.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

Figure 1:
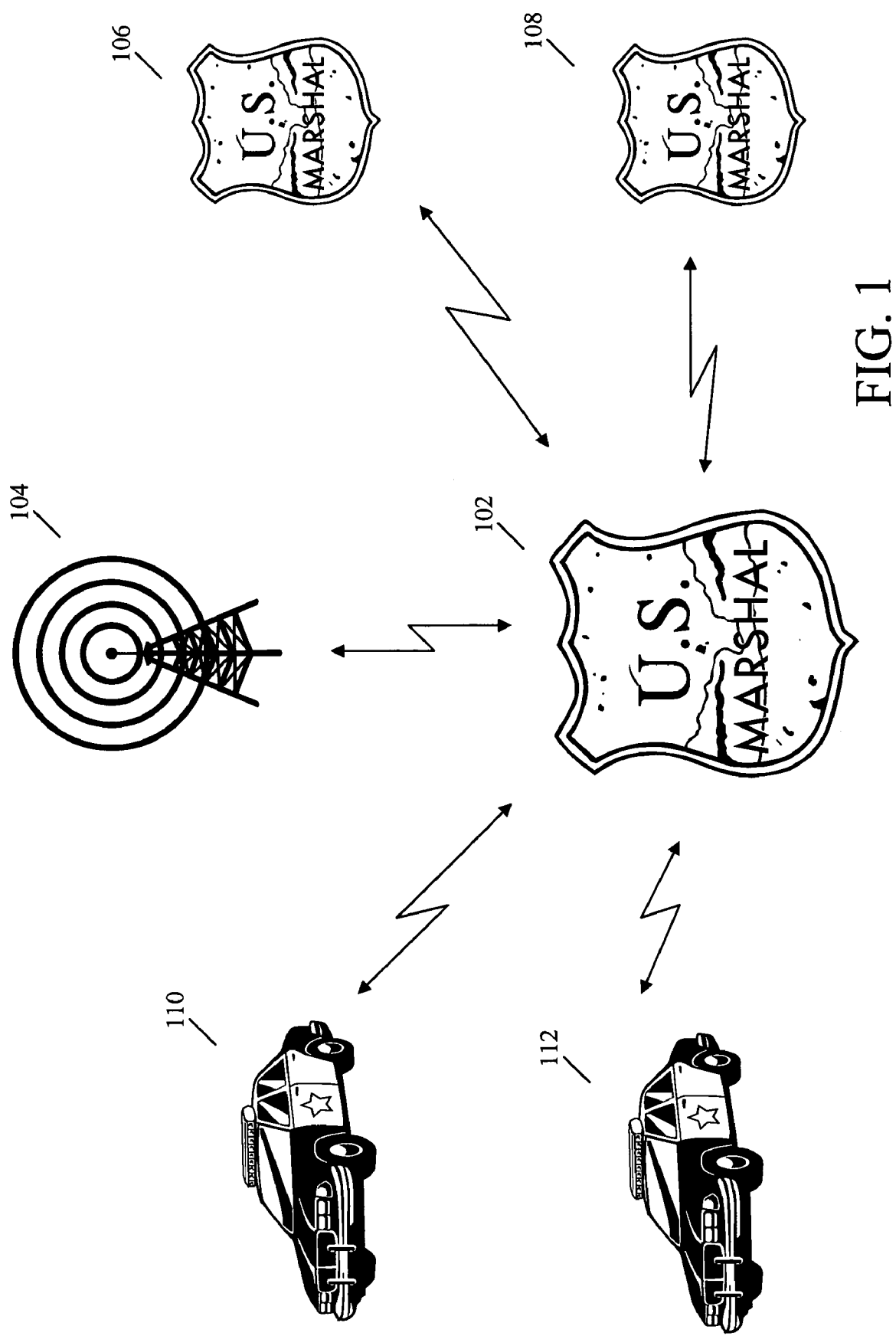
FIG. 1 is a block diagram showing a wireless communication network in one embodiment of the present invention.

FIG. 1 is a block diagram showing a wireless communication network in one embodiment of the present invention. FIG. 1 shows a multi-information recording device 102 embodied in the form of a badge that may be worn by a user, such as a police officer or other law enforcement professional. The multi-information recording device 102 embodied in the form of a badge includes a mechanism for attaching the mechanism to a user's person by using a strap, by coupling with a clothes pin or by integrating the module in a parcel of clothing. Note that although the multi-information recording device 102 is embodied in the form of a badge, other embodiments are possible, such as a module hidden within clothing or other parcel worn by a user.

The multi-information recording device 102 includes modules for recording video, audio and other types of information, including personal information, situational information and environmental information. The components of the multi-information recording device 102 are described in greater detail below with reference to FIGS. 2 and 3 below. The multi-information recording device 102 further includes a radio frequency transmitter and receiver for communicating with other entities via a wireless network, such as a short range wireless network using the Bluetooth or IEEE 802.11 protocol. The multi-information recording device 102 can communicate with a radio frequency device within the vehicle of the user, such as police vehicle 112, or radio frequency devices within the vehicles of other users, such as police vehicle 110, when such vehicles are nearby.

The multi-information recording device 102 can further communicate with a radio frequency tower 104, such as a commercial cellular tower or a police band radio tower. The multi-information recording device 102 can further communicate with the multi-information recording devices of other users, such as multi-information recording device 106 and multi-information recording device 108.

The multi-information recording device 102 can transmit and receive signals between other entities, such as 110, 112, 104, 106 and 108. The multi-information recording device 102 can transmit and receive video, audio and other types of information, including personal information, situational information and environmental information.

Figure 2:
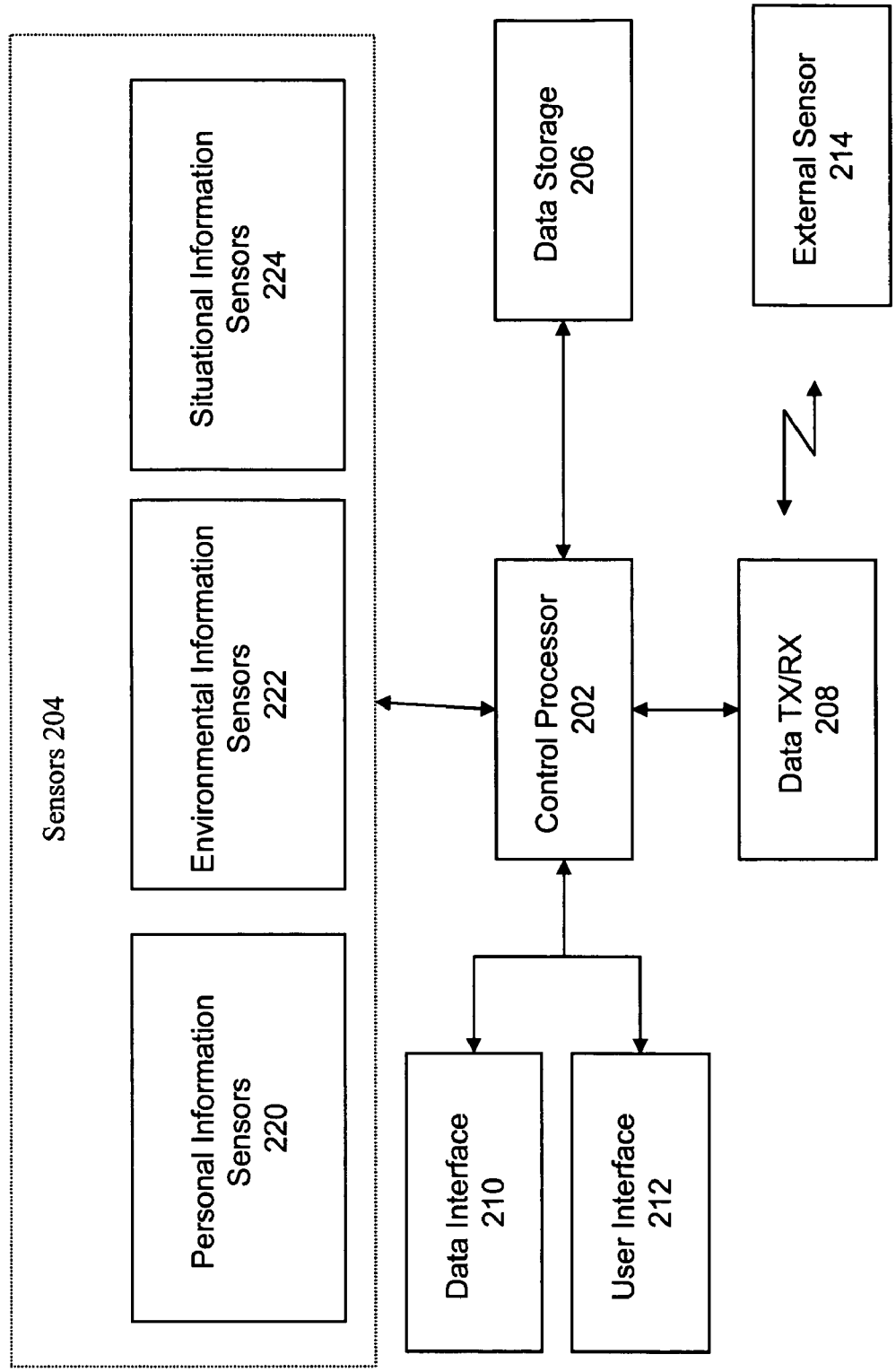
FIG. 2 is a block diagram showing the main components of the recording device, according to an embodiment of the invention.

FIG. 2 is a block diagram showing the main components of the recording device 102, according to an embodiment of the invention. The multi-information recording device 102 includes a control processor 202, that acts as the central processor for all processes and actions of the multi-information recording device 102. Connected to the control processor 202 is a data storage unit 206 for storing all types of information captured or received by the multi-information recording device 102. The data storage unit 206 can be a hard drive, a RAM or a Flash memory. Also connected to the control processor 202 is a data transmission and reception unit 208 used for transmitting and/or receiving data via radio frequencies.

The multi-information recording device 102 further includes a data interface 210 that allows for a physical interface to the multi-information recording device 102 for allowing the ingress or egress of data. The data interface 210 can be a USB port, a serial port, a FireWire port, or any other type of data port that allows for the access of data stored in the data storage unit 206. The multi-information recording device 102 further includes a user interface 212 that allows for a user to interface with the multi-information recording device 102 to control the device or to access data, write data, overwrite data, or erase data stored in the data storage unit 206. The user interface 212 can be a small display, a few small buttons, a speech-recognition audio interface or any combination of the aforementioned items.

The multi-information recording device 102 further includes a batch of sensors 204, including a set of personal information sensors 220 for capturing biological information of the user, a set of environmental sensors 222 for capturing data pertaining to the user's environment and a set of situational sensors 224 for capturing data pertaining to the particular situation of the user. The types of sensors in each set are described in greater detail with reference to FIG. 3 below.

In a small device such as the multi-information recording device 102, the desire to save space is high. To this end, a small data storage device 206 is desired. As such, it is beneficial to conserve the amount of storage space in the data storage unit 206 by recording information from the sensors 204 only when necessary. The present invention provides a method for detecting situations requiring the recording of information from the sensors 204, and automatically triggering the recording of information when such situations are detected.

Automatic activation and deactivation of recording functions conserves space in the small data storage device 206. Also, the battery life of the power source used to power the recording function is preserved, thereby allowing for prolonged use of the multi-information recording device 102 without a battery change or a battery charge. Furthermore, automatic activation and deactivation of recording functions reduces the total amount of audio/video that is recorded on the small data storage device 206, which in turn reduces the amount of audio/video that must be reviewed when a pertinent incident must be investigated.

The multi-information recording device 102 further includes an external sensor 214 that communicates via radio frequency with the multi-information recording device 102 further via the data transmission and reception unit 208. In one embodiment of the present invention, the external sensor 214 is a sensor that is located in the gun holster of the user or in the gun of the user. The external sensor 214 senses the removal of the gun from the gun holster and immediately sends a radio frequency signal to the multi-information recording device 102 via the data transmission and reception unit 208, so as to indicate that the multi-information recording device 102 begin recording data captured by any of the sensors 204. Conversely, if the external sensor 214 senses the insertion of the gun into the gun holster, it immediately sends a radio frequency signal to the multi-information recording device 102 via the data transmission and reception unit 208, so as to indicate that the multi-information recording device 102 stop recording data.

The data transmission and reception unit 208 of the multi-information recording device 102 can be used to communicate data that has been stored in the data storage unit 206, including audio/video data or any other data collected from any sensors 204. This data can be transmitted via a wireless link to another unit that is equipped with a compatible wireless link, such as the user's vehicle 112, also having storage capacity. For example, when a user having the multi-information recording device 102 is within range of the user's vehicle 112, the data can automatically be transmitted to the user's vehicle 112 so as to free up space on the data storage device 206. Alternatively, the data interface 210 of the multi-information recording device 102 can be used to communicate data that has been stored in the data storage unit 206 to the user's vehicle 112. Once the data has been transferred to the user's vehicle 112, the data can later be downloaded from the user's vehicle 112 to a central database or repository (via data interface or wireless link between the vehicle and the headquarters). For example, when the user's vehicle 112 returns to headquarters after a shift, the data can be downloaded from the user's vehicle 112 to a central database at headquarters.

Figure 3:
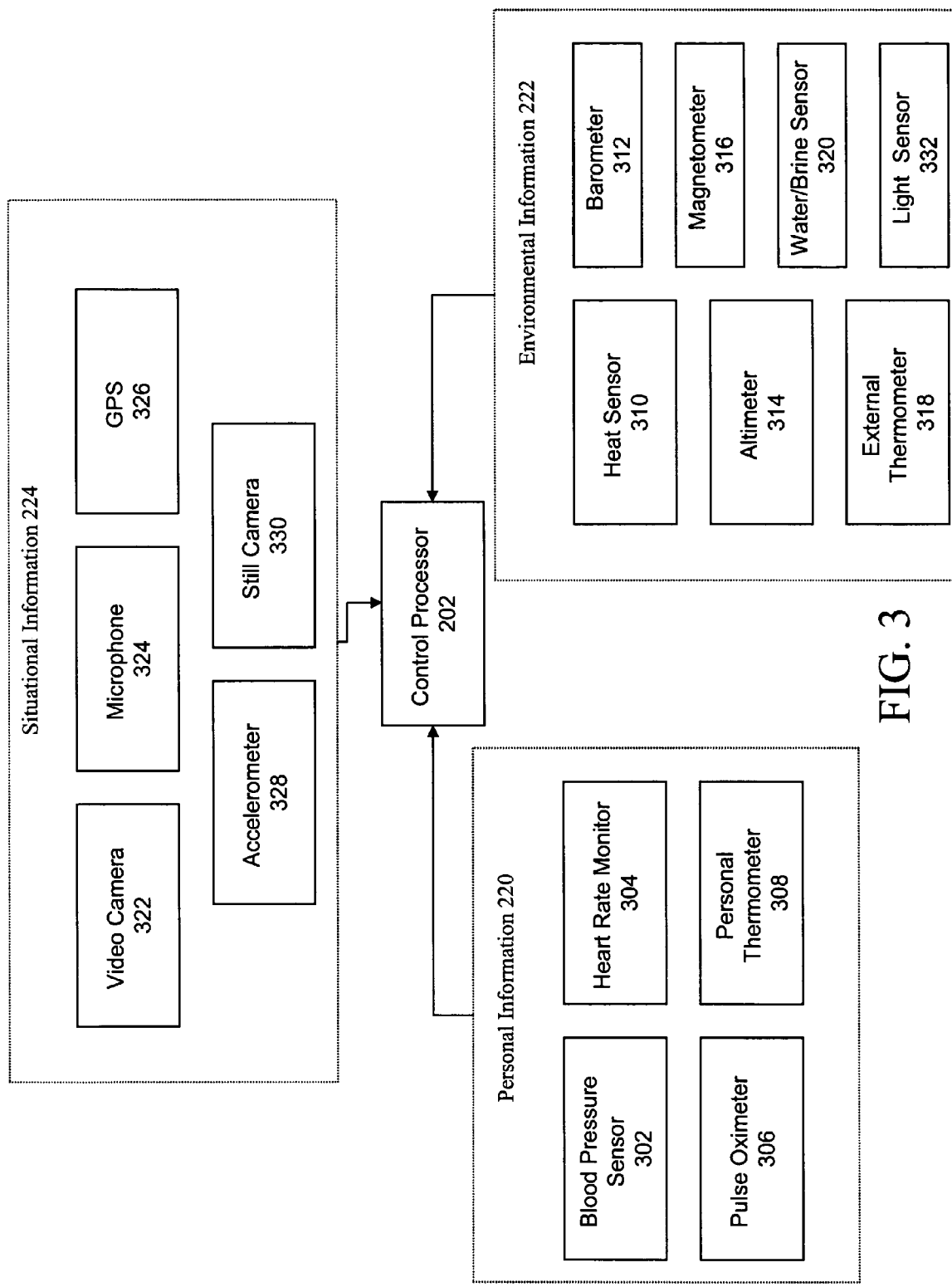
FIG. 3 is a block diagram showing the sensor components of the recording device, according to an embodiment of the invention.

FIG. 3 is a block diagram showing the sensor components of the recording device, according to an embodiment of the invention. The multi-information recording device 102 includes a batch of sensors 204, including a set of personal information sensors 220 for capturing biological information of the user. This includes a blood pressure monitor 302 for measuring the blood pressure of the user, a heart rate monitor 304 for measuring the heart rate of the user, a pulse oximeter 306 for measuring the blood oxygen rate of the user and a personal thermometer 308 for measuring the body temperature of the user.

The multi-information recording device 102 further includes a set of environmental sensors 222 for capturing data pertaining to the user's environment. This includes a heat sensor 310 for measuring heat encountered by the user, such as in a fire, a barometer 312 for measuring ambient air pressure, such as in a situation involving an explosion, an altimeter 314 for measuring the altitude of the user, a magnetometer 316 for measuring magnetic fields or the existence of large metal objects, an external thermometer 318 for measuring ambient temperature, a water/brine sensor 320 for sensing the presence of water or brine, such as in the event that the user falls into water or the sea, as in a man-overboard situation and a light sensor 332 for sensing ambient light.

The multi-information recording device 102 further includes a set of situational sensors 224 for capturing data pertaining to the particular situation of the user. This includes a video camera 322 for capturing live video, a microphone 324 for capturing live audio, a Global Positioning System (GPS) module 326 for calculating the location of the user, an accelerometer 328 for measuring sudden changes in acceleration, such as in a vehicle accident or to sense the wearer falling from a tall building, and a still camera 330 for capturing still images.

Figure 4:
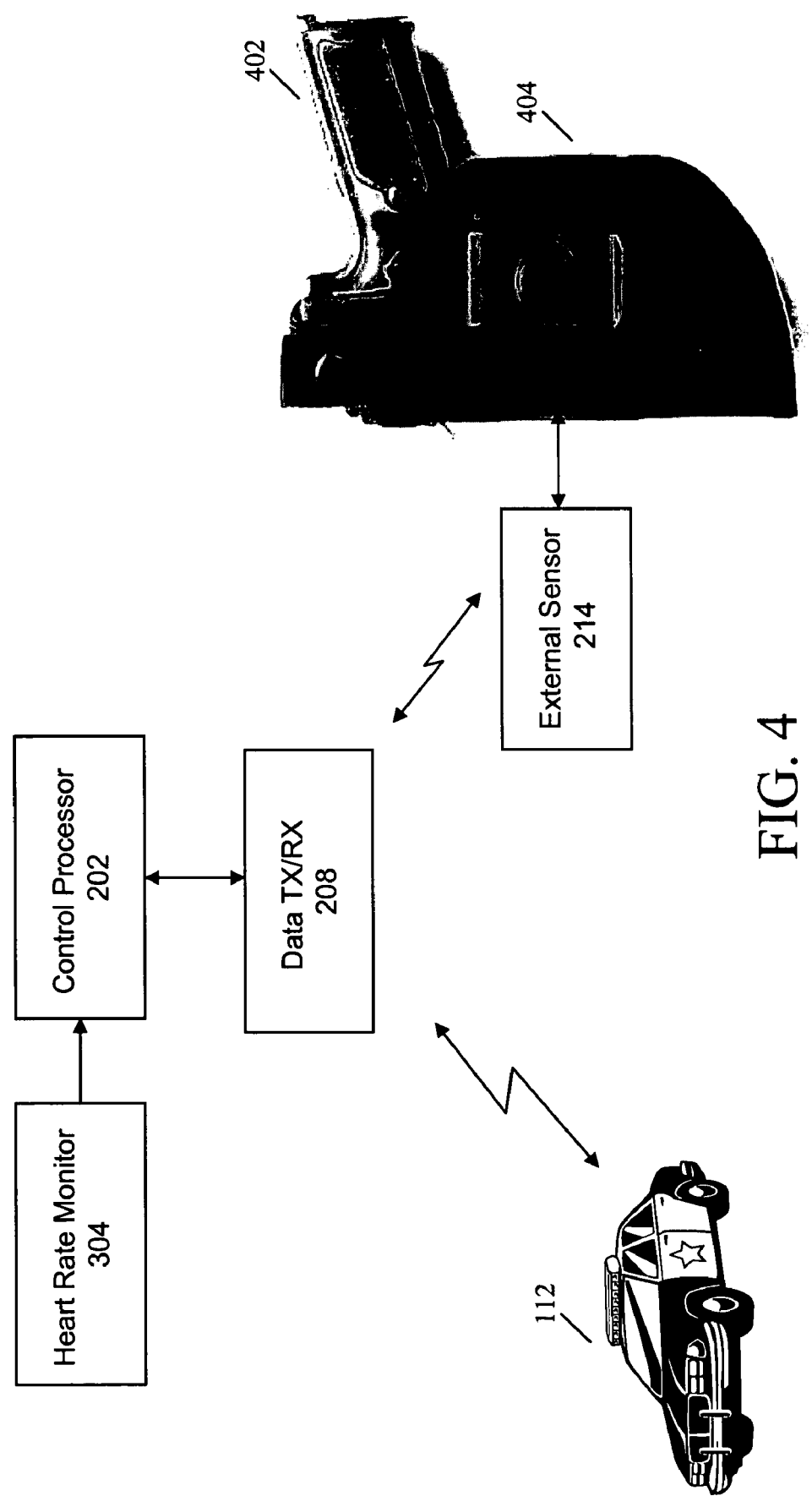
FIG. 4 is a block diagram showing a recording trigger scheme of the recording device, according to an embodiment of the invention.

FIG. 4 is a block diagram showing a recording trigger scheme of the recording device, according to an embodiment of the invention. FIG. 4 shows various mechanisms by which the multi-information recording device 102 is commanded to begin recording data captured by the sensors 204. In one embodiment of the present invention, the multi-information recording device 102 is in radio contact with the user's vehicle 112 using radio signals that are exchanged via the data transmission and reception unit 208. When the user and the multi-information recording device 102 move to a location that is beyond a threshold distance from the user's vehicle 112, the multi-information recording device 102 senses such a separation and automatically begins recording information captured by any of the sensors 204.

The multi-information recording device 102 may detect that signals are no longer being received from the user's vehicle 112 due to the distance, and thus automatically begins recording information. Alternatively, the multi-information recording device 102 may detect that signals are being received from the user's vehicle 112 are weakened due to the distance, and thus automatically begins recording information. In another alternative, the multi-information recording device 102 may detect from timestamps in the signals being received from the user's vehicle 112 that there is a minimum distance between the multi-information recording device 102 and the user's vehicle 112, and thus automatically begins recording information. Conversely, if the multi-information recording device 102 determines from signals received from the user's vehicle 112 that the distance between the device and vehicle has returned to a smaller distance, the multi-information recording device 102 may automatically stop recording information.

In another embodiment of the present invention, the multi-information recording device 102 includes an external sensor 214 that communicates via radio frequency with the multi-information recording device 102 via the data transmission and reception unit 208. The external sensor 214 is a sensor that is located in the gun holster of the user or in the gun of the user. The external sensor 214 senses the removal of the gun 402 from the gun holster 404 and immediately sends a radio frequency signal to the multi-information recording device 102 via the data transmission and reception unit 208, so as to indicate that the multi-information recording device 102 begin recording data captured by any of the sensors 204. This is because the removal of a gun 402 from a holster 404 often indicates that the wearer is entering into a hostile situation where recording may be important. Conversely, if the external sensor 214 senses the insertion of the gun 402 into the gun holster 404, it immediately sends a radio frequency signal to the multi-information recording device 102 via the data transmission and reception unit 208, so as to indicate that the multi-information recording device 102 stop recording data.

In another embodiment of the present invention, the multi-information recording device 102 includes an heart rate monitor 304 that measure the heart rate of the user wearing the multi-information recording device 102. If the heart rate monitor 304 measures a heart rate of the user greater than a threshold, the multi-information recording device 102 may begin recording data captured by any of the sensors 204. This is because a high heart rate may indicate a problem situation or some type of situation that requires recording. Conversely, if the multi-information recording device 102 determines that the heart rate of the user has decreased to below the threshold, the multi-information recording device 102 may automatically stop recording information.

In another embodiment of the present invention, the multi-information recording device 102 can receive a signal from a dispatcher at headquarters or other entity, via the data transmission and reception unit 208. A dispatcher, for example, is typically in radio communication with a user, such as a police officer. The dispatcher may have certain information pertaining to the situation of the police officer, such as when the dispatcher dispatches the officer to a hostile situation. In such a situation, the dispatcher may send a signal, via a tower such as 104 or vehicle 110, to the multi-information recording device 102 via the data transmission and reception unit 208. Upon receiving the signal, the multi-information recording device 102 may begin recording data captured by any of the sensors 204. Conversely, if the dispatcher has knowledge that the situation is no longer hostile, the dispatcher may send another signal to the multi-information recording device 102 to automatically stop recording information.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 5:
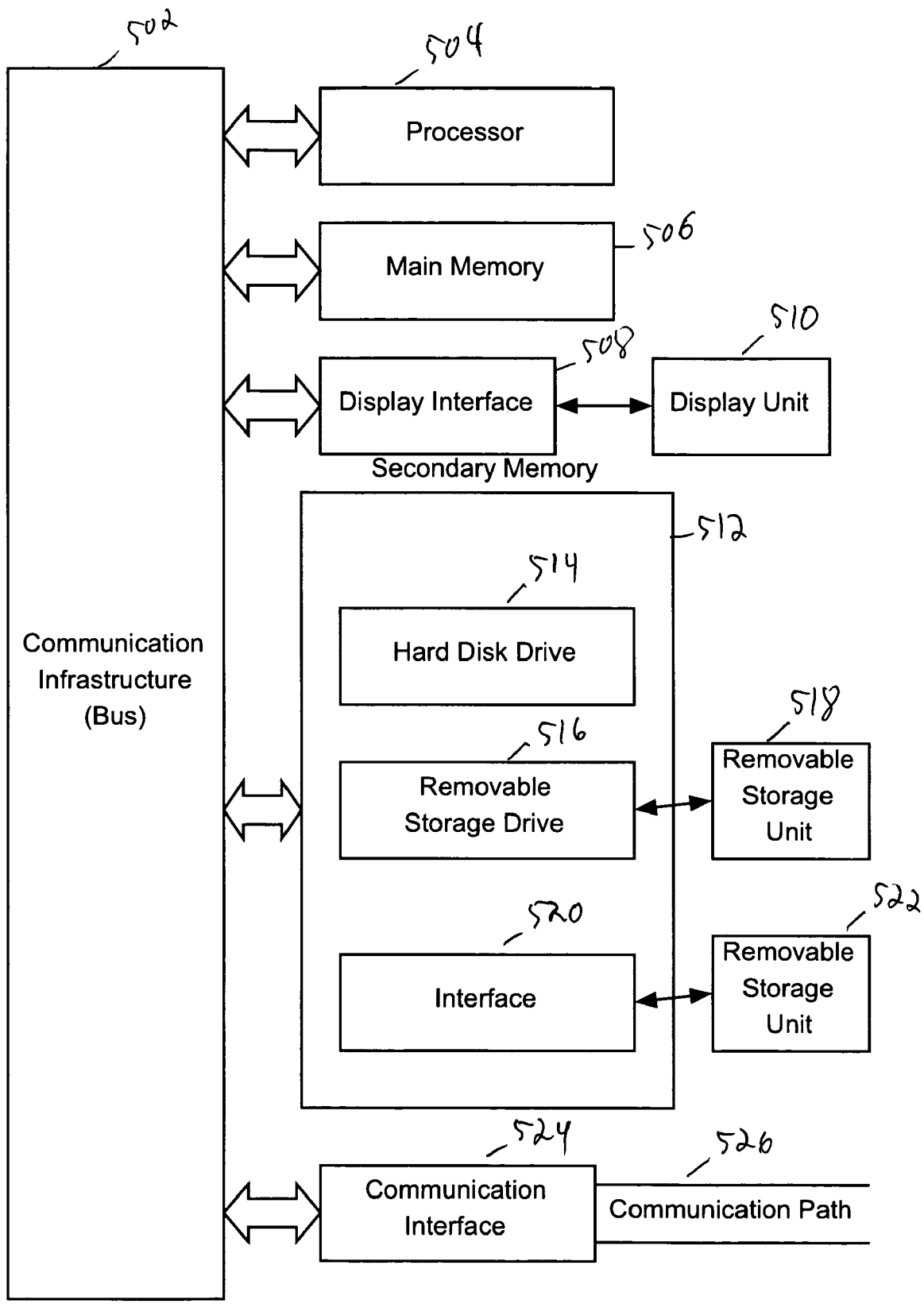
FIG. 5 is a high level block diagram showing an information processing system useful for implementing one embodiment of the present invention.

FIG. 5 is a high level block diagram showing an information processing system useful for implementing one embodiment of the present invention. The computer system includes one or more processors, such as processor 504. The processor 504 is connected to a communication infrastructure 502 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 508 that forwards graphics, text, and other data from the communication infrastructure 502 (or from a frame buffer not shown) for display on the display unit 510. The computer system also includes a main memory 506, preferably random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. Removable storage unit 518, represents a floppy disk, a compact disc, magnetic tape, optical disk, etc. which is read by and written to by removable storage drive 516. As will be appreciated, the removable storage unit 518 includes a computer readable medium having stored therein computer software and/or data.

In alternative embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system.

The computer system may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (i.e., channel) 526. This channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium.

Computer programs (also called computer control logic) are stored in main memory 506 and/or secondary memory 512. Computer programs may also be received via communications interface 524. Such computer programs, when executed, enable the computer system to perform the features of the present invention as discussed herein. In particular, the computer programs, when executed, enable the processor 504 to perform the features of the computer system. Accordingly, such computer programs represent controllers of the computer system.

What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will be understood by those skilled in the art that other modifications can be made within the spirit of the invention.

What is claimed is:

1. An information processing device worn on a person carrying a weapon, the device comprising:

a housing comprising a badge form factor;

an apparatus for securing the housing to the person;

a video camera for capturing video information only upon receipt of a trigger;

wherein the trigger comprises at least one signal indicating a situation selected from a group consisting of:

a hostile situation;

the information processing device is approaching a threshold distance from the remote wireless unit;

the weapon has been removed from a holster;

a microphone for capturing audio information only upon receipt of the trigger;

at least one biometric sensor that emits signals comprising biometric data comprising blood pressure data, heart rate data, blood oxygen level data and temperature data;

at least one environmental sensor that emits signals comprising environmental data comprising heat data, barometric pressure data, altitude data, magnetic field data, temperature data and a presence of water and brine;

at least one situational sensor that emits signals comprising situational data comprising location data, still image data, speed data, and acceleration data;

a user interface that allows the person to control the device; said user interface comprising a data interface that allows ingress and egress of data, providing the user with an ability to access data, write data, overwrite data, and erase data in a storage;

the storage, operatively coupled with the processor, for storing the biometric data, environmental data, situational data, the video information, the audio information, and any user input;

a radio frequency transceiver for sending and receiving a wireless signal to and from a remote wireless unit installed in the person's vehicle;

an ex situ sensor located on or near the weapon and operatively coupled with the transceiver; and a processor operatively coupled with the radio frequency transceiver, said processor comprising logic for:

determining a type and strength of the signal;

determining from an absence of the signal that the remote wireless unit is a minimum distance from the device;

determining from a timestamp in the signal that the remote unit is a minimum distance from the device;

determining from a strength of the signal that the remote unit is a minimum distance from the device; and depending upon the type and strength of the signal, performing one action selected from a group consisting of: automatically activating recording functions of the device by transmitting the trigger; automatically deactivating the recording functions of the device; and transmitting recorded data from the storage to the remote unit; and erasing the recorded data from the storage after each transmission.

* * * * *